United States Patent [19]
Clausen et al.

[11] 3,751,135

[45] Aug. 7, 1973

[54] REAR PROJECTION SCREEN

[76] Inventors: Erik Clausen; Johannes Clausen, both of DK-4540 Farevejle, Denmark

[22] Filed: June 23, 1972

[21] Appl. No.: 265,453

[30] Foreign Application Priority Data
June 25, 1971 Denmark .................... 3133/71

[52] U.S. Cl. ................... 350/117, 350/126
[51] Int. Cl. ........................... G03b 21/60
[58] Field of Search ............ 350/117, 126, 127, 350/129; 161/3.5; 117/132 C; 264/1

[56] References Cited
UNITED STATES PATENTS 3,612,650  10/1971  Miyano et al. ............... 350/126
3,655,262  4/1972  De Palma ..................... 350/126
3,682,530  8/1972  De Palma et al. ............. 350/126

Primary Examiner—Samuel S. Matthews
Assistant Examiner—Richard A. Wintercorn
Attorney—Watson, Cole, Grindle & Watson

[57] ABSTRACT

A screen for rear projection the image forming element which consists of a sheet having a thickness of 0.2 – 1.5 mm and consisting of opaline polymethyl methacrylate containing dispersed calcium and/or magnesium carbonate of a grain size less than 1 $\mu$, said sheet either having a covering at the rear side consisting of a transparent lacquer having a thickness of 10 – 100 $\mu$ wherein glass particles having a grain size of 5 – 50 $\mu$ are dispersed or glass particles of said kind being dispersed in the material of which the sheet consists.

2 Claims, 3 Drawing Figures

REAR PROJECTION SCREEN

BACKGROUND OF THE INVENTION

Rear projection screens are known in several embodiments. E.g. such screens are known comprising a glass plate which is made rough by etching or grinding and plastic plates treated in the same way. Moreover, screens are known comprising glass or plastic plates covered by means of light diffusing coatings.

One problem to be solved by such screens is the avoiding of points of scintillation. Such points may be avoided by using two screens each provided with a light diffusing surface or coating and by moving the two screens with respect to each other. Due to an interference phenomenon the points are avoided in this way. However, screens of the latter kind is rather difficult to use because they need a mutual movement and in case both screens are image forming, the image may be blurred due to the fact that an image is formed on both screens and in two different planes.

Accordingly, it is an object of the present invention to provide a screen by means of which the image is formed in one plane only and wherein points of scintillation are avoided. According to the invention it has been realized that a plastic sheet consisting of an opaline or milky plastic material is able to form an image without points of scintillation but on the other hand such sheet has the drawback that the source of light by means of which the image is projected will appear clearly on the screen. Such appearance of the light source on a projecting screen is termed "hot-spot" effect. However, according to the present invention it has been realized that such hot-spot effect may be avoided by combining a plastic material as mentioned above with light refracting particles having a grain size between 5 and 50 $\mu$.

SUMMARY OF THE INVENTION

A screen for rear projection comprising in combination an opaline plastic material and light refracting particles having a grain size between 5 and 50 $\mu$.

DESCRIPTION OF THE PREFERRED EMBODIMENT

Figure 1:
FIG. 1 illustrates the path of rays through a sheet of opaline plastic material.
Figure 2:
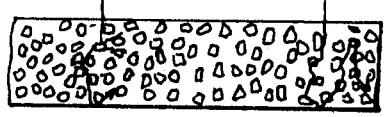
FIG. 2 illustrates the path of rays through an embodiment of the rear projection screen according to the invention, and FIG. 3 the path of rays through another embodiment of the screen according to the invention.

On the drawing, 1 is an opaline or milky plastic sheet consisting of polymethyl methacrylate or another transparent resin having corresponding index of refraction containing 1 percent silicone oil of a viscosity of 100 c.p. and 1 o/oo benzoyl peroxide wherein calcium and/or magnesium carbonate having an average grain size less than 1 $\mu$ is dispersed in a concentration between 0.5 – 1.5 percent. Such opaline plastic material has a certain degree of light conducting effect as indicated in FIG. 1 by means of an crumpled path of rays. However, such path of rays apply only as regards rays from the short wavelength range of the spectrum, i.e. the blue-green range. However, more long waved light, i.e. light from the red range of the spectrum has a tendency to pass directly through the plastic material. Accordingly, screens for rear projection cannot be made from such material because the observer will be able to see the source of light through the screen. According to the present invention it has been realized provided a material of the kind explained above contains light refracting particles having an index of refraction which is 5 – 15 percent higher than the index of refraction of the plastic material and in a suitable small concentration, viz. between 1 – 15 percent so that the average spacing of the individual light refracting particles is less than the wavelength of long-waved light and of an average grain size between 5 and 50 $\mu$ as illustrated in FIG. 2, also the long-waved light will be refracted, viz. by means of the light refracting particles and without giving rise to any points of scintillation in the image formed. As light refracting particles glass particles are used, e.g. crown glass particles which have an index of refraction which is 5 – 15 percent higher than the index of refraction of polymethyl methacrylate.

Figure 3:
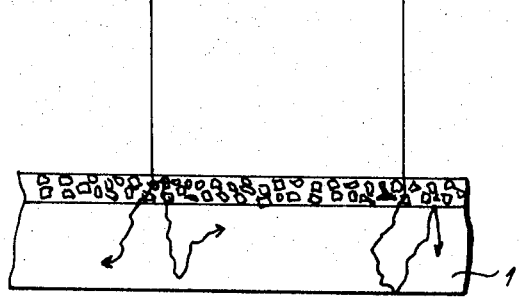

Instead of dispersing the light refracting particles in the plastic material for the manufacture of the screen as illustrated in FIG. 2, the screen according to the present invention may be constructed as illustrated in FIG. 3. In FIG. 3, 1 is a sheet of opaline plastic material of the same kind as explained with reference to FIG. 1. On the rear side of the sheet 1, i.e., the side on which the image is projected, the wheel is provided with a coating consisting of a transparent lacquer wherein light refracting particles are dispersed. The lacquer does not contain more light refracting particles than necessary for preventing long-waved light from passing the layer of light refracting particles without being refracted. This effect is achieved in accordance with the present invention by selecting a thickness of the layer of dispersed light refracting particles between 10 and 10 $\mu$ and using an average grain size between 5 and 50 $\mu$. Also in the embodiment illustrated in FIG. 3, light refracting particles are used, the index of refraction of which is between 5 and 15 percent higher than the index of refraction of the lacquer (in the dry condition thereof) wherein the particles are dispersed by coating the sheet 1. In the embodiment illustrated in FIG. 3, also crown glass has been used for the light refracting particles and the lacquer is a transparent thermoplastic lacquer sold in Denmark by "Berg's Lakfabrik" under the trademark "Nr. 2000." However, also a lacquer which forms polymethyl methacrylate by the evaporation of the solvent may be used.

A sheet of polymethyl methacrylate having a thickness between 0.2 – 1 mm containing 1 percent finely pulverized calcium and/or magnesium carbonate, 1 percent silicone oil having a viscosity of 100 c.p. and 1 o/oo benzoyl-peroxide has proved to have a suitable opaline degree. A higher concentration of calcium and/or magnesium carbonate up to 1.5 percent is used for sheets having a smaller thickness down to 0.2 mm and if a thickness of the sheet up to 1.5 mm is selected a smaller concentration down to 0.5 percent calcium and/or magnesium carbonate is to be used.

It will be understood that FIGS. 2 and 3 illustrate the image forming element only for the screen according to the invention and if this element *per se* is not selfsupporting it is used in combination with a glass plate or a transparent plastic plate which serves as a carrier for the screen element and supplies it with the strength required.

We claim:

1. Rear projecting screen, comprising a sheet of polymethyl methacrylate having a thickness between 0.2 and 1.5 mm and containing approximately 1 percent silicone oil having a viscosity of approximately 100 c.p. and approximately 1 o/oo benzoyl-peroxide wherein 0.5 – 1.5 percent calcium and/or magnesium carbonate having an average grain size less than 1 $\mu$ is dispersed together with 1 – 15 percent glass particles having an average grain size between 5 and 50 $\mu$.

2. Rear projection screen comprising a sheet of polymethyl methacrylate having a thickness between 0.2 mm and 1.5 mm and containing approximately 1 percent silicone oil having a viscosity of approximately 100 c.p. and approximately 1 o/oo benzoyl-peroxide wherein 0.5 – 1.5 percent calcium and/or magnesium carbonate having an average grain size less than 1 $\mu$ is dispersed, said sheet having a coating consisting of a transparent lacquer having a thickness of 10 – 100 $\mu$ and containing glass particles having an average grain size between 5 and 50 $\mu$.

* * * * *